United States Patent [19]  [11] Patent Number: 4,913,598
Dozier  [45] Date of Patent: Apr. 3, 1990

[54] PNEUMATIC TRANSPORT SYSTEM TERMINAL

[76] Inventor: Charles W. Dozier, 10750 Forest La., Dallas, Tex. 75243

[21] Appl. No.: 240,194

[22] Filed: Sep. 6, 1988

[51] Int. Cl.⁴ ............................................. B65G 51/32
[52] U.S. Cl. ................................... 406/112; 406/148; 406/180
[58] Field of Search ....................... 406/13, 26, 27, 83, 406/110, 112, 148, 180

[56] References Cited

U.S. PATENT DOCUMENTS

| | | | |
|---|---|---|---|
| 1,807,096 | 5/1931 | Zimmer | 406/110 |
| 3,226,055 | 12/1965 | Suhr | 243/19 |
| 3,298,632 | 1/1967 | Carson | 243/19 |
| 3,306,555 | 8/1967 | Tonne | 243/19 |
| 3,311,321 | 3/1967 | Hoehmann | 243/1 |
| 3,438,337 | 4/1969 | Edwards | 104/156 |
| 3,482,801 | 12/1969 | Leontas | 243/35 |
| 3,506,216 | 4/1970 | Delamater | 243/35 |
| 3,556,436 | 1/1971 | Roelandt | 243/35 |
| 3,599,898 | 8/1971 | Bontempelli | 243/19 |
| 3,610,554 | 10/1971 | Schwarz | 243/19 |
| 3,618,874 | 11/1971 | Kettering | 243/19 |
| 3,633,976 | 11/1970 | Kruyer | 302/2 |
| 3,659,809 | 5/1972 | Cook | 243/19 |
| 3,690,593 | 9/1972 | Kettering | 243/34 |
| 3,701,497 | 10/1972 | Anders | 243/35 |
| 3,711,038 | 1/1973 | Van Otteren | 243/2 |
| 3,738,592 | 6/1973 | Smith | 243/19 |
| 3,756,536 | 9/1973 | Weissmuller | 243/19 |
| 3,778,006 | 12/1973 | Martin | 243/19 |
| 3,788,577 | 1/1974 | Barnett | 243/35 |
| 3,790,102 | 2/1974 | Tearne | 243/19 |
| 3,828,698 | 8/1974 | Delamater | 109/19 |
| 3,841,584 | 10/1974 | Robinson | 243/19 |
| 3,948,466 | 4/1976 | Rudder | 243/24 |
| 3,964,693 | 6/1976 | Thomas | 243/24 |
| 3,976,264 | 8/1976 | Ekama | 243/19 |
| 3,985,316 | 10/1976 | Weissmuller | 243/19 |
| 3,998,405 | 12/1976 | Carlier | 243/19 |
| 4,004,753 | 1/1977 | Thomas | 243/19 |
| 4,032,082 | 6/1977 | Weissmuller | 243/19 |
| 4,059,246 | 11/1977 | Anders et al. | 243/7 |
| 4,135,684 | 1/1979 | Willey | 243/19 |
| 4,180,354 | 12/1979 | Greene | 406/112 |
| 4,189,260 | 2/1980 | Morano | 406/76 |
| 4,189,261 | 2/1980 | Kelly et al. | 406/112 |
| 4,256,418 | 3/1981 | Stangl | 406/112 |
| 4,325,660 | 4/1982 | Jones | 406/84 |
| 4,343,574 | 8/1982 | Anders | 406/13 |
| 4,352,603 | 10/1982 | Anders | 406/27 |
| 4,395,164 | 7/1983 | Beltrop | 406/74 |
| 4,407,613 | 10/1983 | Jones | 406/84 |
| 4,436,456 | 3/1984 | Thomas | 406/19 |
| 4,455,112 | 6/1984 | Anders | 406/110 |
| 4,462,721 | 7/1984 | Anders | 406/112 |
| 4,465,410 | 8/1984 | Vogel et al. | 406/111 |
| 4,466,761 | 8/1984 | Beltrop | 406/74 |
| 4,512,688 | 4/1985 | Hochradel | 406/111 |
| 4,540,317 | 9/1985 | Vogel | 406/112 |
| 4,661,026 | 4/1987 | Carlier | 406/74 |
| 4,710,098 | 12/1987 | Anders | 415/149 |

OTHER PUBLICATIONS

The Security Center, Inc. brochure entitled "Security's Auto-Matic Remote Transaction System"/w drawings.
The Security Center Inc. brochure entitled "Security's Auto-Matic Arts V Remote Transaction System"/w drawings.
A-Ware Air Systems, Inc. brochure entitled "A-Ware Pneumatic Tube Systems"/w/drawings.

Primary Examiner—Sherman D. Basinger
Attorney, Agent, or Firm—Richards, Medlock & Andrews

[57] ABSTRACT

A pneumatic transport system terminal utilizing discs of resilient material to form a terminal chamber in conjunction with an inner cylinder whereby air may be forced into the chamber increasing pressure so the carrier is propelled through the carrier tube, the air flow may be reversed creating a vacuum in the carrier tube whereby the carrier may be retrieved.

20 Claims, 2 Drawing Sheets

PNEUMATIC TRANSPORT SYSTEM TERMINAL

TECHNICAL FIELD

The present invention relates to pneumatic transport system terminals and systems.

BACKGROUND OF THE INVENTION

Pneumatic transport systems in the main are used for transfer of small to medium size objects up to a few pounds over predetermined distances along a rigid path between terminals, such as between a teller and bank customer. This is accomplished by forcing a carrier through tubes by the use of air pressure or vacuum.

Previous systems incorporate cumbersome and extremely complex and costly terminals for receiving and sending carriers. These terminals required extensive installation costs, many times including complete remodeling of existing structures. Additionally, these terminals utilized complex electronics in their operation requiring extensive repair due to failures and damage to the terminal, particularly damage caused by customers and their cars. Thus, a need exists for simple easy to install and replace terminals that are efficient and simple to use without the need for extensive electronics located at the terminal.

SUMMARY OF INVENTION

The pneumatic transport system terminal of the present invention utilizes discs of resilient material as bearings which also act as seals forming an airtight chamber in the terminal.

The carrier is placed into the chamber through openings in the housing and inner cylinder. The openings are subsequently misaligned forming a closed chamber. Air is forced into the chamber by a blower, the increasing pressure propelling the carrier through the carrier tube. The blower is reversible creating a vacuum in the carrier tube propelling the carrier through the carrier tube by suction. Most of the electronics needed for the system are located with the blower away from the terminals; this allows for easy and inexpensive installation and replacement of the terminals.

BRIEF DESCRIPTION OF THE DRAWINGS

Further objectives and advantages of the invention will become more apparent from the following Detailed Description and claims, and from the accompanying drawings, wherein:

DETAILED DESCRIPTION

Figure 1:
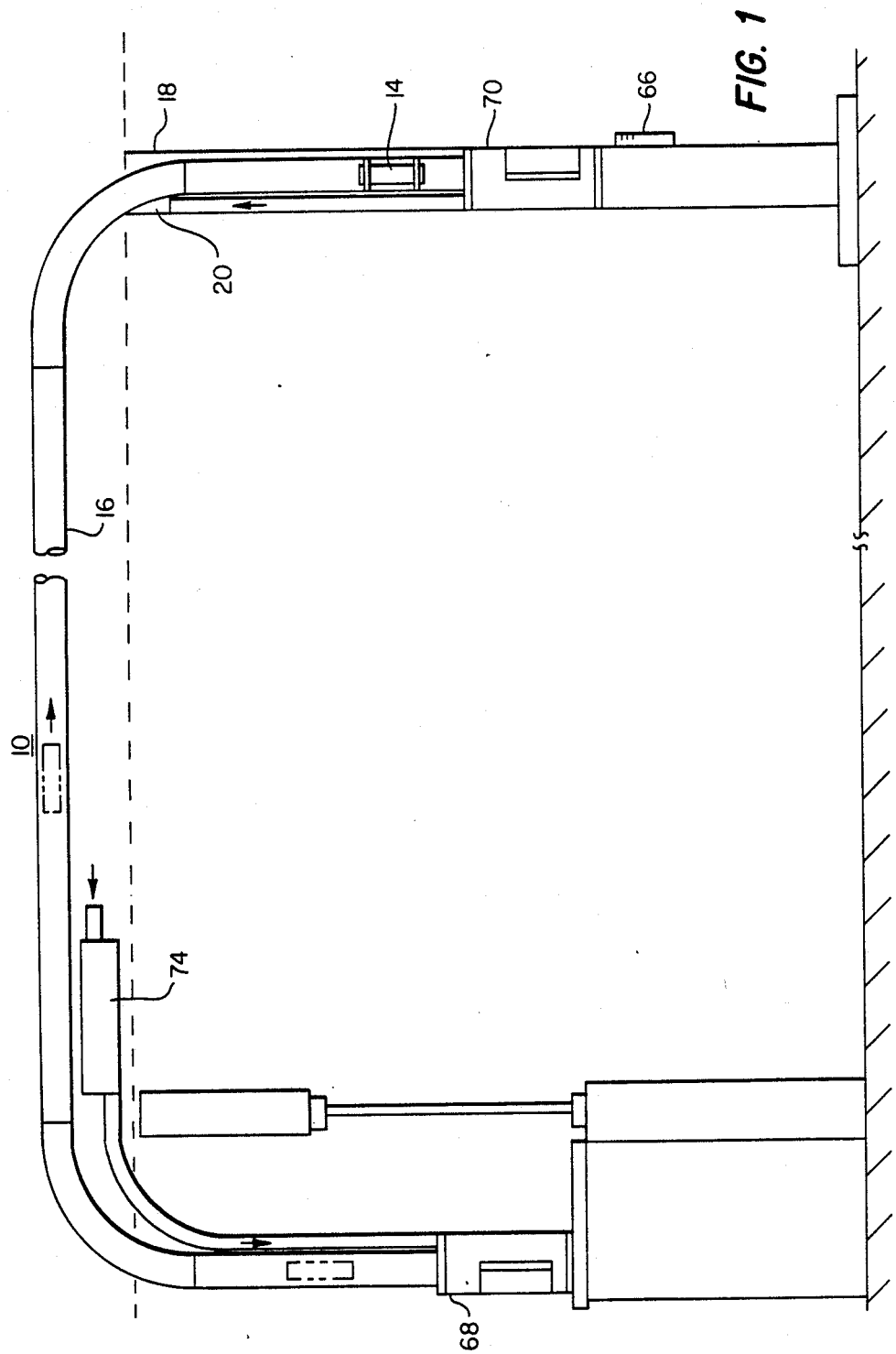
FIG. 1 is a side view of a complete pneumatic transport system utilizing the terminals of the present invention.
Figure 2:
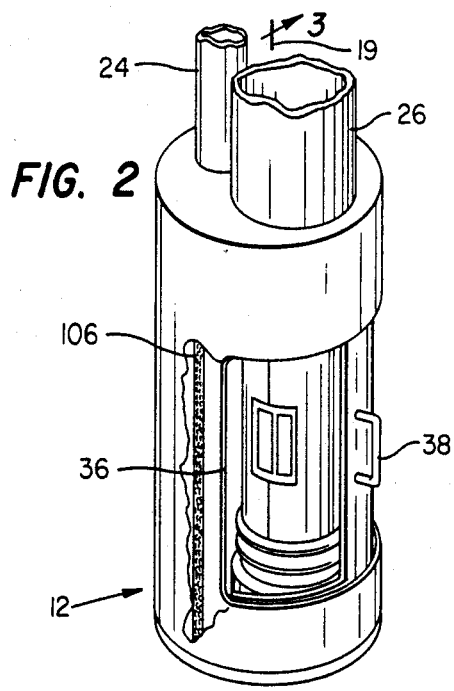
FIG. 2 is an isometric view of a terminal with cutaway view.
Figure 3:
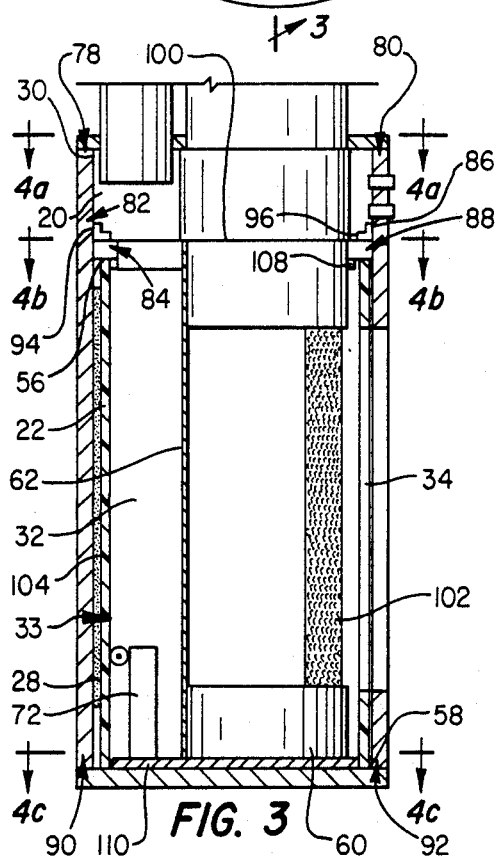
FIG. 3 is a sectional view of the terminal.
Figure 4A:
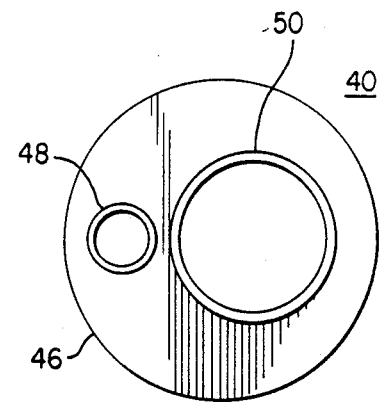
FIGS. 4a, 4b and 4c are top views of the individual discs.
Figure 4B:
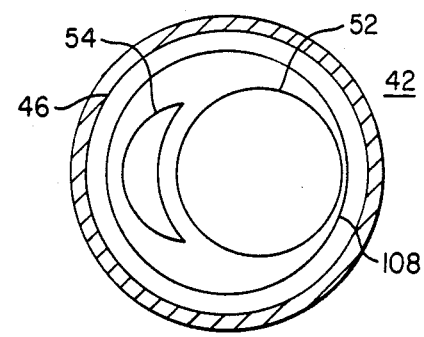
Figure 4C:
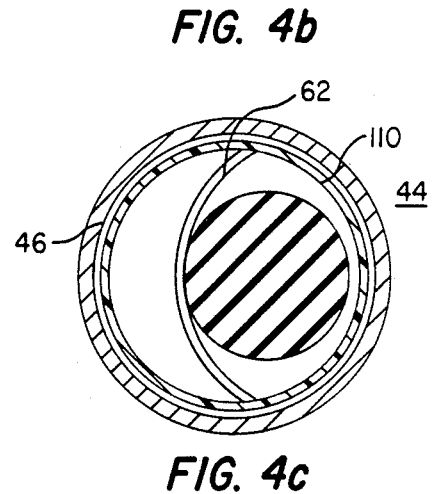

With reference now to the drawings, a pneumatic transport system 10 as shown in FIG. 1 utilizing a first embodiment of the present invention is shown. The terminal 12, as will be described hereinafter, is a station for receiving and sending a carrier 14 prescribed distances along a carrier tube assembly 16. Pressure sends the carrier 14 to the customer, vacuum retrieves the carrier from the customer.

The terminal housing 18 is cylindrical and has a cavity 20 large enough to accommodate the inner cylinder 22 as well as the tube 24 and carrier tube 26. The inner cylinder 22 has an outer diameter 28 which is slightly smaller than the diameter of the housing cavity 30. The inner cylinder 22 has a cavity 32 of sufficient diameter 33 to allow entry of the carrier 14. Both the housing 18 and the inner cylinder 22 have openings 34 and 36 in their sides. The inner cylinder 22 is positioned in the housing cavity 20 so alignment of the two openings 34 and 36 is achieved whereby the carrier 14 may be placed into or removed from the inner cylinder cavity 32. The inner cylinder 22 is rotated about the vertical axis 19 within housing 18. A handle 38 on the inner cylinder 22 extending through the housing opening 36 provides a means by which the inner cylinder 22 may be rotated to achieve both alignment and misalignment of the openings 34 and 36.

The terminal 12 is sealed by three discs 40, 42, 44 of resilient material. All discs 40, 42, 44 have an outer diameter 46 which is greater than the diameter of the housing cavity 30, thus, upon positioning of the discs 40, 42, 44 with respect to the housing cavity 20, an airtight seal is formed. The discs can be held in place by frictional engagement or are secured to the housing by screws 76, 78, 80, 82, 84, 86, 88, 90, 92, or other suitable fastening structure. The first disc 40 is located with respect to the housing cavity 20 above the housing opening 36 secured by screws 76, 78 to the housing. The second disc 42 is located in the housing cavity 20 below the first disc 40 and above the housing opening 36 and is secured by screws 80, 82, 84, 86. Screws 80, 82, 84, 86 secure the second disc 42 by right angle brackets 94 and 96 located above the second disc 42 in the housing cavity 20, bracketing the top of the second disc 100 with the housing 18.

The third disc 44 is located with respect to the housing cavity 20 below the housing opening 36 and is secured by screws 88, 90 and 92 to the housing.

The first disc 40, located above the housing opening 36, has two bores 48 and 50. The first bore 48 allows passage of and seals against the blower tube 24. The second bore 50 allows passage of and seals against the carrier tube 26.

The second disc 42, located below the first disc 40 and above the housing opening 36, has a bore 52 and an aperture 54. The bore 52 acts as a seal to the end of the carrier tube 64 which extends through the second bore 50 of the first disc 40. The aperture 54 allows passage of air from the blower tube 24 into the inner cylinder cavity 32. The second disc 42 further acts as a seal against the top of the inner cylinder 56 as well as the housing 18. The second disc 42 having a raised surface 108 acting as a guide around which the inner cylinder 22 rotates so as to maintain the position of the inner cylinder 22 relative to the housing 18.

The third disc 44, located below the housing opening 36, acts as a seal against the bottom of the inner cylinder 58 as well as the housing 18. A pad 60 of resilient material is fixed to the third disc 44 and acts as a stop for a carrier 14 entering the terminal 12 as well as a shock absorber. The third disc 44 having a raised surface 110 acting as a guide around which the inner cylinder 22 rotates so as to maintain the position of the inner cylinder 22 relative to the housing 18.

A carrier guide 62, is positioned in the inner cylinder cavity 32, so as to direct and facilitate placement of the carrier 14 in the inner cylinder cavity 32 into the bore of the second disc 52 and against the carrier tube end 64.

A carrier tube 14 is placed into the inner cylinder cavity 32 through the housing and inner cylinder openings 34 and 36, into the bore of the second disc 52 and against the carrier tube end 64, the inner cylinder 22 is rotated by the handle 38 so as to misalign the housing opening 36 and the inner cylinder opening 34 thus sealing the terminal 12, without the use of mechanical or electrical latching systems. Air is forced into the cavity 32, of the inner cylinder 22 through the tube 24 and aperture of the second disc 54 by the blower 74, thus increasing the air pressure in the inner cylinder 22 whereby the carrier 14 is propelled through the carrier tube 26. The blower 74 may be reversed so the direction of air in the tube 24 is reversed, creating a vacuum in carrier tube 26, whereby the direction the carrier 14 is traveling may be reversed, thus allowing retrieval of the carrier 14 by vacuum.

An intercom system 66 may be employed with the system 10 to allow communication between the bank customer and bank teller terminals 68 and 70.

A contact switch 72 may be located in the inner cylinder cavity 32 whereby the power supplied to the blower 74 is disconnected so as to prevent transfer of the carrier 14 when the terminal 12 is open.

Strips of velcro 102, 104 and 106, namely the complimentary surface of adhesive pile, may be attached to the outer diameter 28 of the inner cylinder 22, or the housing cavity 20 parallel to the vertical axis 19 of the housing 18, on either side of the housing opening 36 or inner cylinder opening 34. The velcro strips 102, 104 and 106 should be located between the inner cylinder 22 and housing cavity 20. The velcro strips 102, 104 and 106 act as seals, maintaining the pressure or vacuum in the inner cylinder cavity 32, when the carrier 14 is being transferred from one terminal 12 to another, thus increasing the amount of weight which may be transferred by the system 10.

While one embodiment of the present invention has been described in the foregoing Detailed Description, and illustrated in the accompanying drawings, it will be understood that the invention is not limited to the embodiment disclosed, but is capable of numerous rearrangements, modifications and substitutions of parts and elements without departing from the scope and spirit of the invention.

I claim:

1. Pneumatic transport system terminals for receiving and sending a carrier between a bank customer and a bank teller or the like, comprising:
    a housing having a cavity, a side and an opening through the side,
    an inner cylinder having a cavity, a top, a bottom, a side and an opening through the side,
    two or more discs of resilient material acting as bearings, positioned with respect to the housing cavity forming an airtight seal above and below the housing opening, at least two of the bearings sealing against the top and bottom of the inner cylinder,
    a carrier tube having an end and extending through the bearings located above the housing opening to the inner cylinder cavity,
    a means for selectively providing a vacuum or pressure to the inner cylinder cavity, and
    a carrier is placed in the inner cylinder cavity through the housing and inner cylinder openings sealing against the carrier tube end, the inner cylinder opening is closed, air is forced into the inner cylinder by the pressure means, thus increasing pressure in the inner cylinder cavity propelling the carrier through the carrier tube, alternatively, the pressure means is reversed creating a vacuum in the carrier tube whereby the direction the carrier is traveling may be reversed, thus retrieving the carrier by vacuum.

2. The pneumatic transport system of claim 1 incorporating an intercom system whereby the bank customer and bank teller may communicate.

3. The pneumatic transport system terminal of claim 1 having a resilient pad located at the bottom of the inner cylinder cavity acting to absorb shock transmitted to the terminal upon arrival of the carrier in the inner cylinder cavity from another terminal.

4. The pneumatic transport system terminal of claim 1 having a contact switch located in the inner cylinder cavity whereby the power to the air flow means is disconnected when the inner cylinder opening is open so as to prevent transfer of the carrier when the inner cylinder opening is open.

5. The pneumatic transport system of claim 1 having a carrier guide located in the inner cylinder cavity whereby the carrier may be directed and properly positioned against the carrier tube end.

6. The pneumatic transport system of claim 1 having a means to secure the position of the resilient discs with respect to the housing cavity relative to the inner cylinder.

7. Pneumatic transport system terminals for receiving and sending a carrier between a bank customer and bank teller or the like, comprising:
    a housing having a side, a cavity, a linear axis and an opening through its side,
    a blower tube,
    a means for blowing air through the blower tube, said means being reversible,
    a carrier tube having an end,
    an inner cylinder having a side, an opening through its side, and a cavity allowing passage of the carrier, the inner cylinder is positioned in the housing and is rotatable about the linear axis of the housing,
    a handle attached to the inner cylinder extending through the housing opening whereby the inner cylinder may be rotated about the linear axis of the housing,
    a first disc of resilient material having a first and second bore, the first disc positioned with respect to the housing providing a seal against the housing, the first disc located above the housing opening,
    a second disc of resilient material having a bore and an aperture, the second disc positioned in the housing providing a seal against the housing, the second disc located below the first disc and above the housing opening,
    a third disc of resilient material located with respect to the housing below the housing opening, providing a seal against the housing,
    a means for securing the position of the discs with respect to the housing relative to the inner cylinder,
    a means for selectively providing a vacuum or pressure to the inner cylinder chamber,
    the first disc acting as a terminal cap, the blower tube extending along the housing cavity and through and sealing against the first bore of the first disc, the carrier tube extending along the housing cavity and through and sealing against the second bore of the first disc and the bore of the second disc, the third disc, second disc and inner cylinder forming a chamber, the openings of the housing and inner cylinder are aligned, thus opening the terminal allowing placement of the carrier in the chamber sealing against the bore of the second disc and the carrier tube end, the inner cylinder is rotated by the handle until the openings are misaligned, thus closing and sealing the terminal, air is blown into the chamber through the tube by the pressure means, increasing pressure in the chamber propelling the carrier through the carrier tube to another terminal, the direction of the pressure means is reversed creating a vacuum in the carrier tube whereby the direction the carrier is traveling may be reversed, thus retrieving the carrier by vacuum.

8. The pneumatic transport system terminal of claim 7 incorporating an intercom system whereby the bank customer and bank teller may communicate.

9. The pneumatic transport system terminal of claim 7 having a resilient pad located adjacent to the third resilient disc acting to absorb shock transmitted to the terminal upon arrival of the carrier in the inner cylinder cavity from another terminal.

10. The pneumatic transport system terminal of claim 7 having a contact switch located in the inner cylinder chamber whereby power to blower is disconnected so as to prevent transfer of the carrier when housing and inner cylinder openings are aligned.

11. The pneumatic transport system terminal of claim 7 having a carrier guide located in the inner cylinder cavity whereby the carrier may be directed and properly positioned against the base of the second disc and the carrier tube end so as to allow transport of the carrier.

12. The pneumatic transport system terminal of claim 7 further comprising said second and third disc having a means to guide the inner cylinder so as to maintain the position of the inner cylinder, relative to the housing, as the inner cylinder is rotated in the housing.

13. The pneumatic transport system terminal of claim 7 further comprising vertical seals positioned in the housing cavity, between the housing and inner cylinder, parallel to the housing and inner cylinder, attached to the housing or inner cylinder, said seals allowing rotation of the inner cylinder while providing greater sealability of the terminal, allowing more weight to be transferred between terminals.

14. Pneumatic transport system terminal for receiving and sending a carrier between a bank customer and bank teller or the like, comprising:

a tubular housing of predetermined length and diameter having a side, a cavity of predetermined diameter, a linear axis and an opening through its side having a first and second side, a blower tube having two ends, a means for blowing air through the blower tube, said means being reversible, a carrier tube having two ends, an inner cylinder of predetermined length and outer diameter having a side, a top end and a bottom end, an opening through its side, and a cavity of predetermined diameter and length, the outer diameter of the inner cylinder being smaller than the inner diameter of the housing whereby the inner cylinder may be located in the housing and rotated about the linear axis of the housing while remaining proximate to the inner diameter of the housing, the inner cylinder cavity inner diameter allowing passage of a carrier, a handle attached to the inner cylinder extending through the housing opening whereby the inner cylinder may be rotated about the linear axis of the housing, rotation of the inner cylinder until the handle is positioned against the first side of the housing opening aligns the housing opening with the inner cylinder opening whereby the terminal is open and the carrier may be taken out of the inner cylinder cavity and subsequently replaced in the inner cylinder cavity, rotation of the cylinder in the opposite direction until the handle rests against the second side of the housing opening completely misaligns the housing opening and inner cylinder opening whereby the terminal is closed, a first disc of resilient material of predetermined diameter, having a first and second bore, the first disc located with respect to the housing perpendicular to the linear axis of the housing, the diameter of the first disc being greater than the housing cavity diameter providing a seal against the housing, the first disc located above the housing opening, a second disc of resilient material of predetermined diameter having a bore and an aperture, the second disc being located in the housing perpendicular to the linear axis of the housing below the first disc and above the housing opening, the diameter of the second disc being greater than the housing cavity diameter, providing a seal against the housing, the second disc bore providing a seal against the carrier tube end and a seat against which the carrier end may be positioned, a third disc of resilient material of predetermined diameter located perpendicular to the linear axis of the housing below the housing opening, the diameter of the third disc being greater than the housing cavity diameter providing a seal against the housing, a means for securing the position of the resilient disc with respect to the housing relative to the inner cylinder, a means for selectively providing a vacuum or pressure to the inner cylinder cavity, the first disc acting as a cap to the terminal, the blower tube extending along the housing cavity and through and sealing against the first bore of the first disc, the carrier tube extending along the housing cavity and through and sealing against the second bore of the first disc and the bore of the second disc, the second disc seated against the top end of the inner cylinder providing a top to the inner cylinder cavity, the aperture of the second disc allowing the passage of air from the tube into the inner cylinder cavity, the third disc seated against the bottom end of the inner cylinder acting as the bottom to the inner cylinder cavity, providing a surface on which the carrier may land upon arrival from another terminal, the carrier being positioned in the terminal while open so as to allow a carrier end to seal against the bore of the second disc and the carrier tube end, the inner cylinder is rotated by the handle until the terminal is closed, thus sealing it, air is blown into the terminal through the tube by the pressure means, increasing pressure in the terminal chamber propelling the carrier through the carrier tube to another terminal, the pressure means is reversed creating a vacuum in the carrier tube whereby the direction of travel of the carrier is reversed, thus retrieval of the carrier may be accomplished by vacuum.

15. The pneumatic transport system terminal of claim 14 incorporating an intercom system whereby the bank customer and bank teller may communicate.

16. The pneumatic transport system terminal of claim 14 having a resilient pad adjacent the third resilient disc acting to absorb shock transmitted to the terminal upon arrival of the carrier in the inner cylinder chamber from another terminal 17. The pneumatic transport system terminal of claim 14 having a contact switch located in the inner cylinder cavity whereby the power supplied to the blower is disconnected so as to prevent transfer of the carrier while the terminal is open.

18. The pneumatic transport system of claim 14 having a carrier guide located in the inner cylinder cavity whereby the carrier may be directed and properly positioned against the bore of the second disc and carrier end so as to allow transport of the carrier.

19. The pneumatic transport system of claim 14 further comprising said second and third disc having raised surfaces located on the disc surfaces mating with the top and bottom of the inner cylinder, providing a guide, maintaining the position of the inner cylinder, relative to the housing, as the inner cylinder is rotated.

20. The pneumatic transport system of claim 14 further comprising vertical seals having a plurality of hair-like extensions on a strip of material positioned in the housing cavity between the housing and inner cylinder, parallel to the housing and inner cylinder, attached to the housing or inner cylinder, said seals allowing rotation of the inner cylinder while roviding greater sealability of the terminal allowing more weight to be transferred between terminals.

* * * * *